US 11,355,280 B2

(12) United States Patent
Nakamura

(10) Patent No.: US 11,355,280 B2
(45) Date of Patent: Jun. 7, 2022

(54) COIL UNIT

(71) Applicant: Toyota Jidosha Kabushiki Kaisha, Toyota (JP)

(72) Inventor: Toru Nakamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 248 days.

(21) Appl. No.: 16/658,897

(22) Filed: Oct. 21, 2019

(65) Prior Publication Data

US 2020/0126717 A1 Apr. 23, 2020

(30) Foreign Application Priority Data

Oct. 23, 2018 (JP) .............................. JP2018-199282

(51) Int. Cl.
*H01F 38/14* (2006.01)
*H02J 50/12* (2016.01)
*H02J 50/70* (2016.01)
*H02J 7/02* (2016.01)
*H01F 27/32* (2006.01)
*H02J 5/00* (2016.01)
*B60L 53/12* (2019.01)
*H01F 27/30* (2006.01)
*H01F 27/36* (2006.01)

(52) U.S. Cl.
CPC .............. *H01F 38/14* (2013.01); *B60L 53/12* (2019.02); *H01F 27/306* (2013.01); *H01F 27/32* (2013.01); *H01F 27/363* (2020.08); *H02J 5/005* (2013.01); *H02J 7/025* (2013.01); *H02J 50/12* (2016.02); *H02J 50/70* (2016.02)

(58) Field of Classification Search
CPC ........ H01F 38/14; H01F 27/306; H01F 27/32; H01F 27/36; H01F 27/02; H01F 27/33; B60L 53/12; B60L 2270/147; H02J 5/005; H02J 7/025; H02J 50/12; H02J 50/70; H02J 2207/50; H02J 7/0013; Y02T 10/70; Y02T 10/7072; Y02T 90/14
USPC ........................................................ 320/108
See application file for complete search history.

(56) References Cited

U.S. PATENT DOCUMENTS

2010/0156344 A1\* 6/2010 Inoue ..................... H02J 50/12
320/108

FOREIGN PATENT DOCUMENTS

JP S51-028882 Y 7/1976
JP 2007-103749 A 4/2007
(Continued)

*Primary Examiner* — Paul Dinh
(74) *Attorney, Agent, or Firm* — Dinsmore & Shohl LLP

(57) ABSTRACT

A power-transmission-side coil unit includes: a housing including a metal case body and a resin cover, an electric device provided in the housing, a metal substrate disposed between the cover and the electric device and covering the electric device, and a power transmission coil. The case body includes a base portion, and a ring-shaped wall portion protruding toward the cover along the outer peripheral edge of base portion inside the outer peripheral edge of base portion. The metal substrate includes a partition wall disposed between the cover and the electric device, and a peripheral wall extending from the partition wall toward the base portion. An end portion of the peripheral wall is disposed in the D direction relative to the upper face of the ring-shaped wall portion. At least part of a lateral face of the peripheral wall is in contact with a lateral face of the ring-shaped wall portion.

4 Claims, 7 Drawing Sheets

(56) References Cited

FOREIGN PATENT DOCUMENTS

| JP | 2007-324469 A | 12/2007 |
|----|---------------|---------|
| JP | 2018-018926 A | 2/2018  |

\* cited by examiner

COIL UNIT

CROSS REFERENCE TO RELATED APPLICATIONS

This nonprovisional application claims priority to Japanese Patent Application No. 2018-199282 filed on Oct. 23, 2018 with the Japan Patent Office, the entire contents of which are hereby incorporated by reference.

BACKGROUND

Field

The present disclosure relates to a coil unit for use in wireless power transmission.

Description of the Background Art

Japanese Patent Laying-Open No. 2018-18926 discloses a wireless power transmission system that wirelessly transmits power from a power-transmission-side coil unit to a power-reception-side coil unit. The power-transmission-side coil unit disclosed in Japanese Patent Laying-Open No. 2018-18926 includes a housing including a metal body and a resin cover, a power transmission coil, a metal substrate for blocking an electromagnetic wave generated by the power transmission coil, and an electric device including a capacitor. The body includes a base portion, and a ring-shaped wall portion rising up from the outer peripheral edge of the base portion toward the resin cover. The electric device is disposed on the base portion. The metal substrate is supported by the ring-shaped wall portion and a support wall provided on the base portion.

SUMMARY

The electric device contained in the housing generates an electric-field noise. The electric-field noise is prevented from leaking out of the housing. The coil unit disclosed in Japanese Patent Laying-Open No. 2018-18926 includes a space in which the electric device is covered with the body of the housing and the metal substrate. However, there may be a gap between the metal substrate and the body (the ring-shaped wall portion). If such a gap is formed, the electric-field noise generated from the electric device may leak out of the housing through the gap without being blocked.

The present disclosure has been made to solve such a problem. An object of the present disclosure is to reduce the leak of the electric-field noise generated from the electric device contained in the housing to the outside of the housing.

The coil unit according to the present disclosure includes: a housing including a metal body, and a resin cover covering the metal body; an electric device provided in the housing; a metal substrate disposed between the cover and the electric device and covering the electric device; a coil provided in the housing; and a shield provided in the housing. The metal substrate includes a partition wall disposed between the cover and the electric device, and a peripheral wall extending from the partition wall toward the metal body. The coil is disposed between the partition wall and the cover. The shield is disposed ahead of a part in a leak direction, the part being a part at which the metal body faces an end portion of the peripheral wall, the leak direction being a direction from inside to outside of the housing at the part. The end portion is disposed in the direction of the metal body relative to a surface of the shield that faces the cover. At least a part of a surface of the peripheral wall that faces the shield is in contact with the shield.

According to the above-described configuration, the electric device is covered with the metal body, the shield, and the metal substrate. The end portion of the peripheral wall of the metal substrate is disposed in the direction of the metal body relative to the surface of the shield that faces the cover, and at least a part of the surface of the peripheral wall that faces the shield is in contact with the shield. This can block the path through which the electric-field noise generated from the electric device directly leaks from the region covered with the metal body, the shield, and the metal substrate. Thus, the electric-field noise generated from the electric device is reflected by the metal body, the shield, and the metal substrate. When the electric-field noise is reflected by the metal substrate and the like, a reflection loss is produced and the electric-field noise is attenuated. This can reduce the leak of the electric-field noise generated from the electric device to the outside of the housing.

In one embodiment, the end portion of the peripheral wall of the metal substrate is disposed in the direction of the metal body relative to a surface of the electric device that faces the metal body.

According to the above-described configuration, the electric-field noise generated from the electric device is more reliably prevented from leaking to the outside from the region covered with the metal body, the shield, and the metal substrate. Accordingly, the electric-field noise generated from the electric device does not leak from the above-described region directly to the outside, and the reflected electric-field noise also does not easily leak to the outside of the above-described region. Thus, the electric-field noise generated from the electric device is repeatedly reflected and attenuated by the metal body, the shield, and the metal substrate, thus reducing the leak of the electric-field noise to the outside of the housing.

In one embodiment, the end portion of the peripheral wall of the metal substrate is in contact with the metal body.

According to the above-described configuration, the electric-field noise generated from the electric device is still more reliably prevented from leaking to the outside from the region covered with the metal body, the shield, and the metal substrate. Accordingly, the electric-field noise generated from the electric device does not leak from the above-described region directly to the outside, and the reflected electric-field noise also does not easily leak to the outside of the above-described region. Thus, the electric-field noise generated from the electric device is repeatedly reflected and attenuated by the metal body, the shield, and the metal substrate, thus reducing the leak of the electric-field noise to the outside of the housing.

Further, since the end portion of the peripheral wall of the metal substrate is in contact with the metal body, the metal substrate is improved in rigidity against, for example, a force applied in the direction from the cover toward the metal body.

In one embodiment, the metal body of the housing has a recess. The end portion of the peripheral wall of the metal substrate is inserted in the recess.

According to the above-described configuration, the electric-field noise generated from the electric device is still more reliably prevented from leaking to the outside from the region covered with the metal body, the shield, and the metal substrate. Accordingly, the electric-field noise generated from the electric device does not leak from the above-described region directly to the outside, and the reflected electric-field noise also does not easily leak to the outside of the above-described region. Thus, the electric-field noise generated from the electric device is repeatedly reflected and attenuated by the metal body, the shield, and the metal substrate, thus reducing the leak of the electric-field noise to the outside of the housing.

Further, since the end portion of the peripheral wall of the metal substrate is in contact with the metal body, the metal substrate is improved in rigidity against, for example, a force applied in the direction from the cover toward the metal body.

A coil unit according to the present disclosure includes: a housing including a metal body, and a resin cover covering the metal body; an electric device provided in the housing; a metal substrate disposed between the cover and the electric device and covering the electric device; a coil provided in the housing; and a shield provided in the housing. The metal substrate includes a partition wall disposed between the cover and the electric device, and a peripheral wall extending from the partition wall toward the metal body. The coil is disposed between the partition wall and the cover. The shield is disposed ahead of a part in a leak direction, the part being a part at which the metal body faces an end portion of the peripheral wall, the leak direction being a direction from inside to outside of the housing at the part. The peripheral wall is located between the electric device and the shield in the leak direction. The end portion is disposed in the direction of the metal body relative to a surface of the shield that faces the cover, and in the direction of the metal body relative to a surface of the electric device that faces the metal body.

According to the above-described configuration, the electric device is covered with the metal body, the shield, and the metal substrate. The end portion of the peripheral wall of the metal substrate is disposed in the direction of the metal body relative to the surface of the shield that faces the cover, and in the direction of the metal body relative to the surface of the electric device that faces the metal body. This can block the path through which the electric-field noise generated from the electric device directly leaks from the region covered with the metal body, the shield, and the metal substrate. Thus, the electric-field noise generated from the electric device is reflected and attenuated by the metal body, the shield, and the metal substrate. This can reduce the leak of the electric-field noise generated from the electric device to the outside of the housing.

A coil unit according to the present disclosure includes: a housing including a metal body, and a resin cover covering the metal body; an electric device provided in the housing; a metal substrate disposed between the cover and the electric device and covering the electric device; and a coil provided in the housing. The metal substrate includes a partition wall disposed between the cover and the electric device, and a peripheral wall extending from the partition wall toward the metal body. The coil is disposed between the partition wall and the cover. The metal body has a recess. An end portion of the peripheral wall is inserted in the recess.

According to the above-described configuration, the end portion of the peripheral wall of the metal substrate is inserted in the recess in the metal body. Thus, the electric device is covered with the metal body and the metal substrate. This can block the path through which the electric-field noise generated from the electric device directly leaks from the region covered with the metal body and the metal substrate, thus preventing the electric-field noise from leaking to the outside. Thus, the electric-field noise generated from the electric device is reflected and attenuated by the metal body and the metal substrate without leaking from the above-described region directly to the outside. This can reduce the leak of the electric-field noise generated from the electric device to the outside of the housing.

The foregoing and other objects, features, aspects and advantages of the present disclosure will become more apparent from the following detailed description of the present disclosure when taken in conjunction with the accompanying drawings.

DETAILED DESCRIPTION

Figure 1:
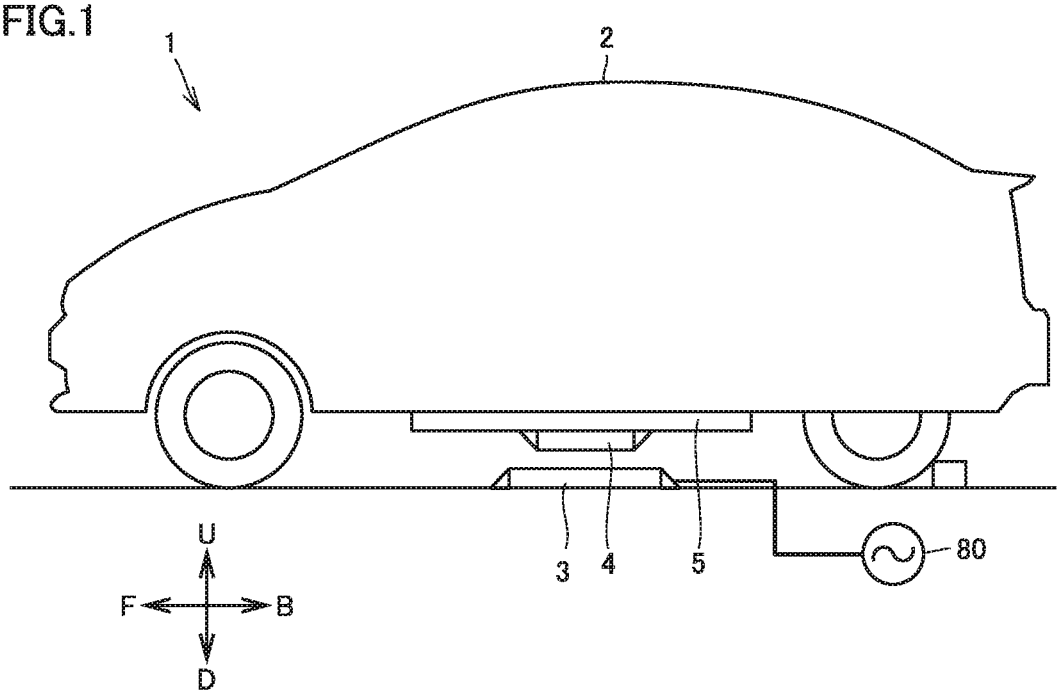
FIG. 1 is a general view of a wireless power transmission system to which a power transmission apparatus according to an embodiment is applicable.

Hereinafter, the present embodiment is described in detail with reference to the drawings. In the drawings, identical or corresponding parts are identically denoted, and the explanation thereof is not repeated.

<General Configuration>

FIG. 1 is a general view of a wireless power transmission system to which a power transmission apparatus according to the present embodiment is applicable. With reference to FIG. 1, a wireless power transmission system 1 includes a vehicle 2 and a power-transmission-side coil unit 3. Power-transmission-side coil unit 3 is installed on the ground.

Hereinafter, in a parking space where power-transmission-side coil unit 3 is installed, the direction of movement of vehicle 2 is defined as F and B directions, and the up and down directions relative to the ground are respectively defined as U and D directions. Although not shown in FIG. 1, the right and left directions relative to vehicle 2 in a parking space are respectively defined as R and L directions. Hereinafter, the U direction may be simply referred to as "upper side", "upper face" and the like, and the D direction may be simply referred to as "lower side", "lower face" and the like.

Vehicle 2 includes a power-reception-side coil unit 4 and a power storage device 5. Power storage device 5 is provided on the lower face of the floor panel of vehicle 2. Power-reception-side coil unit 4 is attached to the lower face of the case of power storage device 5.

Power-transmission-side coil unit 3 receives power supplied from an AC power supply 80 (e.g., a commercial grid power supply). Power-transmission-side coil unit 3 is configured to wirelessly transmit power to power-reception-side coil unit 4 via a magnetic field while vehicle 2 is aligned such that power-reception-side coil unit 4 of vehicle 2 faces power-transmission-side coil unit 3.

Figure 2:
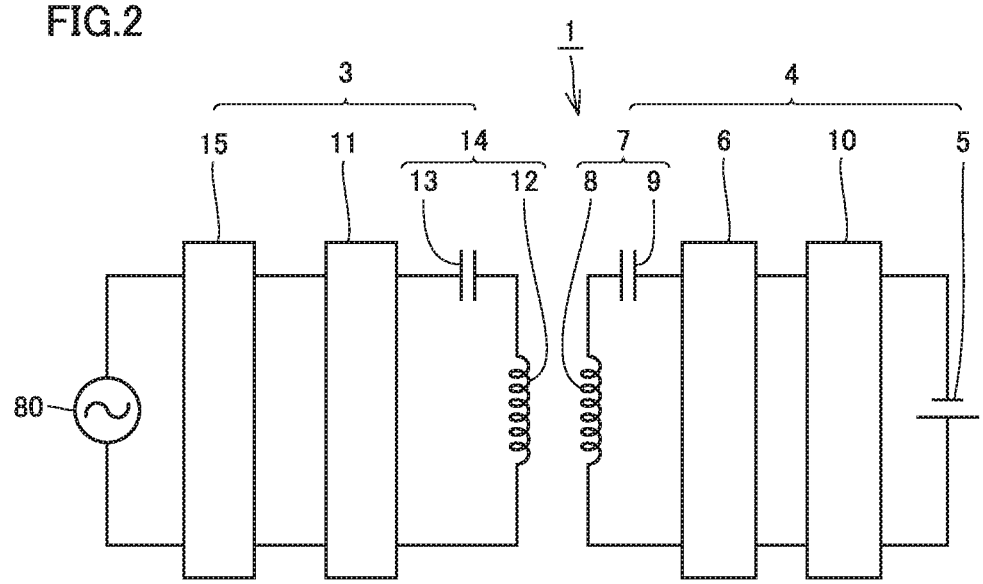
FIG. 2 is a diagram showing an electrical configuration of a wireless power transmission system.

FIG. 2 is a diagram showing an electrical configuration of wireless power transmission system 1 shown in FIG. 1. Power-reception-side coil unit 4 includes a resonant circuit 7, a filter 6, and a conversion device 10. Resonant circuit 7 includes a power reception coil 8 and a capacitor 9. Power reception coil 8 and capacitor 9 are connected to each other in series. Resonant circuit 7 has a Q factor of, for example, 100 or more.

Filter 6 is, for example, an LC filter. Conversion device 10 is a rectifier to convert AC power into DC power.

Power-transmission-side coil unit 3 includes a resonant circuit 14, a filter 11, and a conversion device 15. Resonant circuit 14 includes a power transmission coil 12 and a capacitor 13. Power transmission coil 12 and capacitor 13 are connected to each other in series. Resonant circuit 14 has a Q factor of, for example, 100 or more. Filter 11 is, for example, an LC filter. Conversion device 15 includes an inverter.

In wireless power transmission system 1 configured as described above, power transmission from power-transmission-side coil unit 3 to power-reception-side coil unit 4 is briefly described.

AC power is supplied from AC power supply 80 to conversion device 15. Conversion device 15 boosts the voltage of the supplied AC power, and adjusts the frequency to a prescribed frequency (e.g., several tens of kHz). Filter 11 removes noise from the AC power supplied from conversion device 15, and supplies it to resonant circuit 14. When the AC power is supplied to resonant circuit 14, an electromagnetic field is formed around power transmission coil 12.

When the electromagnetic field formed around resonant circuit 14 reaches power reception coil 8, a power reception current (AC current) flows through power reception coil 8. Filter 6 removes noise from the AC power supplied from resonant circuit 7, and supplies it to conversion device 10. Conversion device 10 converts the supplied AC power into DC power, and supplies the DC power to power storage device 5.

<Power-Transmission-Side Coil Unit>

Figure 3:
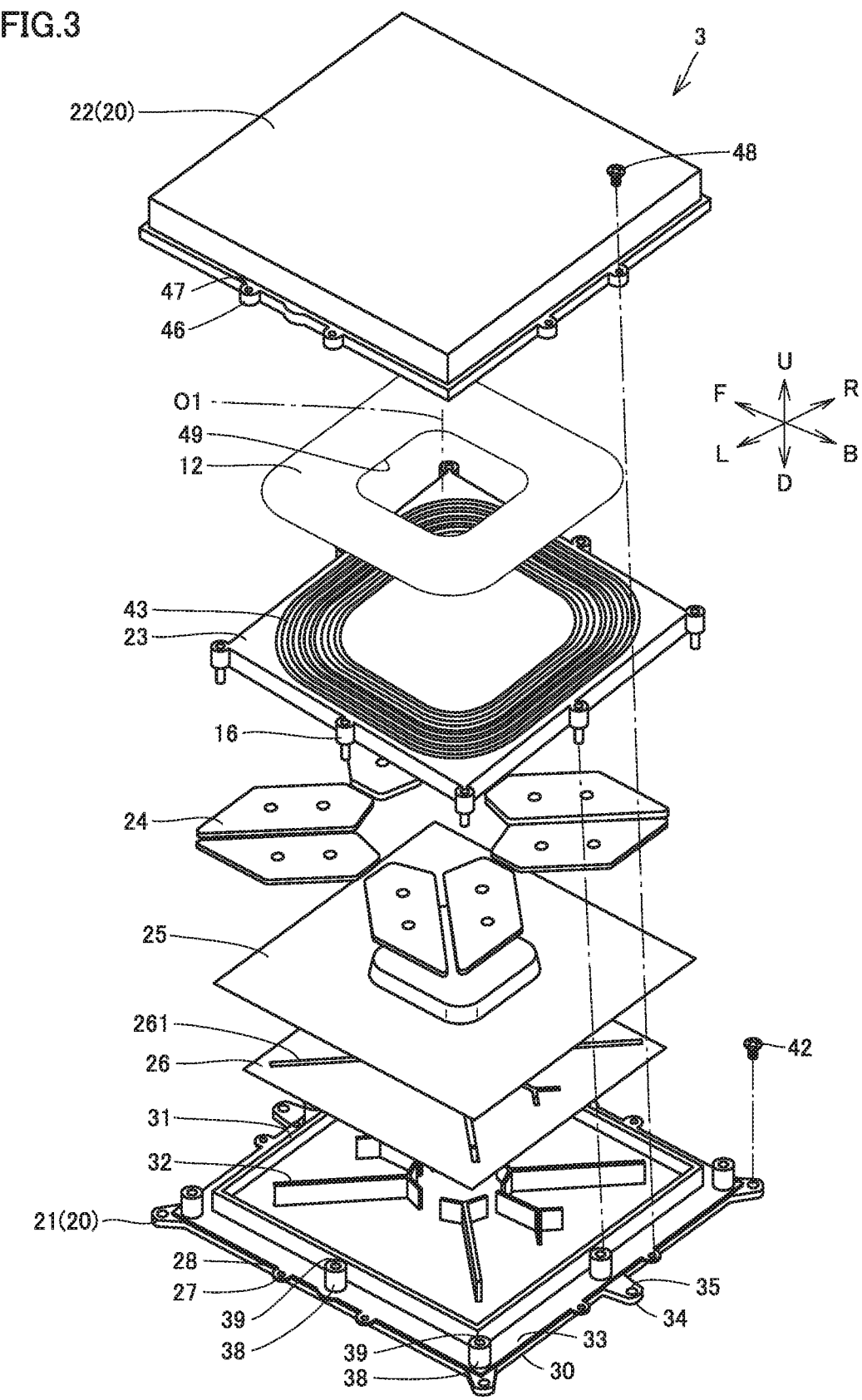
FIG. 3 is an exploded perspective view of a power-transmission-side coil unit according to an embodiment.
Figure 4:
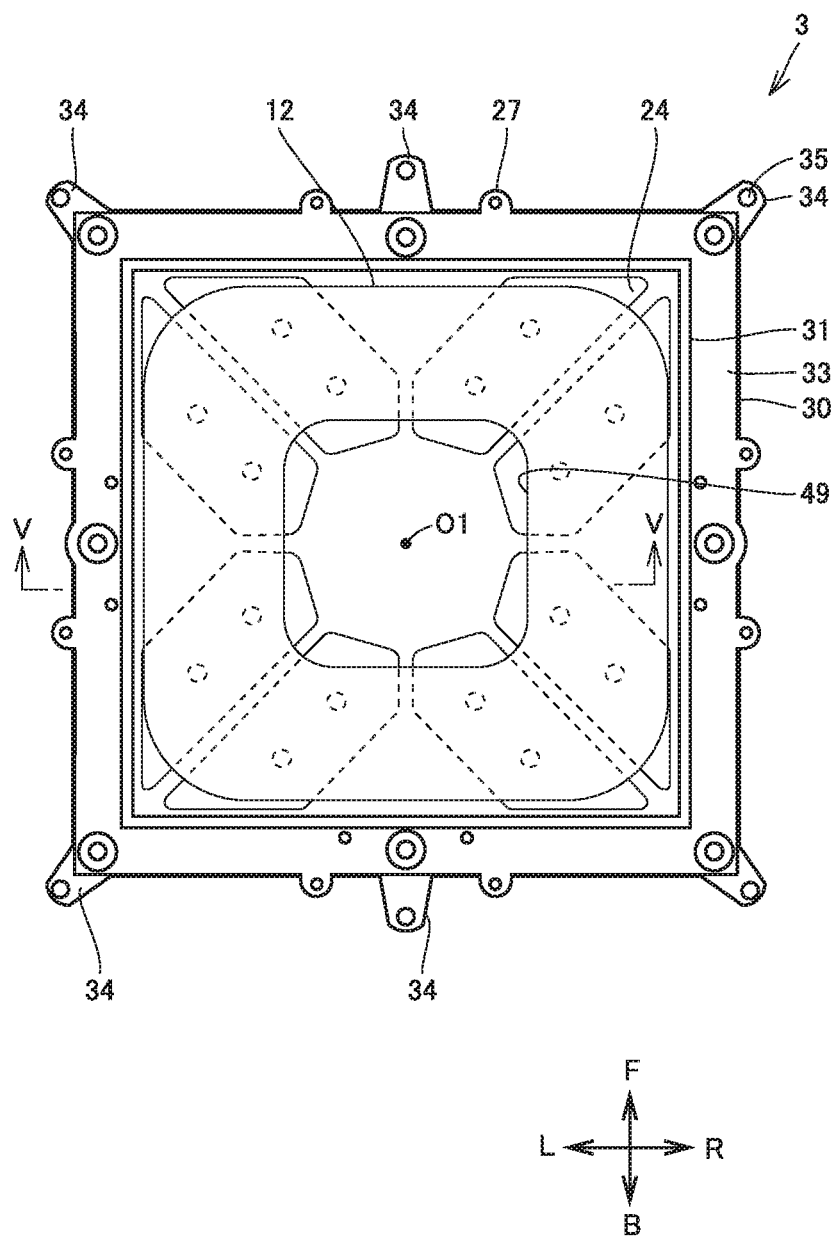
FIG. 4 is a plan view of a power-transmission-side coil unit.
Figure 5:
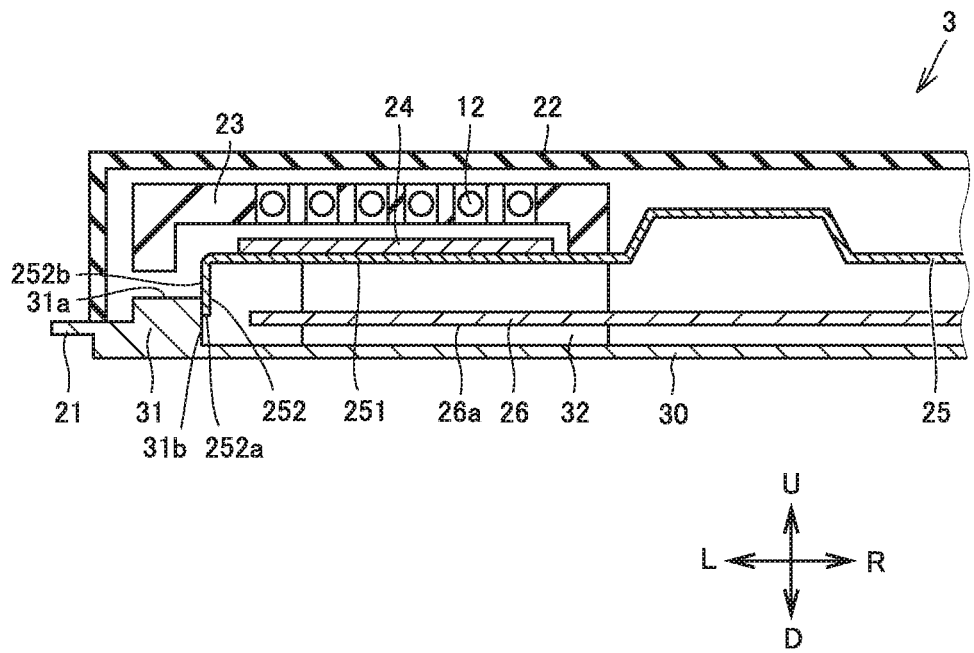
FIG. 5 is a diagram schematically showing the V-V cross section of a power-transmission-side coil unit.

FIG. 3 is an exploded perspective view of power-transmission-side coil unit 3 according to the present embodiment. FIG. 4 is a plan view of power-transmission-side coil unit 3. FIG. 5 is a diagram schematically showing the V-V cross section in FIG. 4. With reference to FIG. 3 to FIG. 5, power-transmission-side coil unit 3 is described.

Power-transmission-side coil unit 3 includes a housing 20; and a power transmission coil 12, a bobbin 23, a plurality of ferrite plates 24, a metal substrate 25, and a substrate 26 contained in housing 20.

Housing 20 includes a case body 21, and a resin cover 22 covering case body 21. Case body 21 is made of, for example, aluminum or aluminum alloy.

Case body 21 includes a base portion 30, a ring-shaped wall portion 31, and a plurality of support walls 32. Base portion 30 is generally in the shape of a flat board. Base portion 30 includes a principal surface 33 facing resin cover 22. Base portion 30 has seats 34 and protrusions 27 at its outer peripheral edge.

Seats 34 have tapped holes 35. Bolts 42 are inserted in tapped holes 35 so as to fix housing 20 to, for example, the ground. Other methods of connection may be used to fix housing 20 to the ground.

Protrusions 27 also have tapped holes 28. Bolts 48 (described later) are inserted in tapped holes 28 so as to fix resin cover 22 to case body 21.

Ring-shaped wall portion 31 is provided on principal surface 33 of base portion 30. Ring-shaped wall portion 31 is provided along the outer peripheral edge of base portion 30 inside the outer peripheral edge of base portion 30. Ring-shaped wall portion 31 protrudes toward resin cover 22 along winding axis O1 of power transmission coil 12. A plurality of bosses 38 are provided between ring-shaped wall portion 31 and the outer peripheral edge of base portion 30. The plurality of bosses 38 each have a hole 39. Ring-shaped wall portion 31 is equivalent to an example of the "shield" according to the present disclosure.

The plurality of support walls 32 are provided on principal surface 33 of base portion 30. The plurality of support walls 32 are disposed inside of ring-shaped wall portion 31. The plurality of support walls 32 extend generally radially from the center of base portion 30. The plurality of support walls 32 protrude toward resin cover 22 along winding axis O1 of power transmission coil 12. The height of the plurality of support walls 32 along the direction of winding axis O1 of power transmission coil 12 is about the same as the height of ring-shaped wall portion 31 along the direction of winding axis O1.

Ring-shaped wall portion 31 and the plurality of support walls 32 support metal substrate 25 from the side opposite to the power transmission coil 12 side with respect to metal substrate 25.

Substrate 26 is fixed to base portion 30 with a fixation portion (not shown) provided on base portion 30 within ring-shaped wall portion 31. Substrate 26 is located between principal surface 33 of base portion 30 and metal substrate 25.

Substrate 26 has a plurality of slits 261. The plurality of slits 261 are located at the places corresponding to the plurality of respective support walls 32. Through each of the plurality of slits 261, a corresponding one of support walls 32 extends.

Substrate 26 includes, mounted thereon, capacitor 13 of resonant circuit 14, filter 11, conversion device 15, a circuit board (not shown). The circuit board includes, mounted thereon, a control device for controlling the components (such as conversion device 15), and various sensors. Capacitor 13 is arranged such that capacitor 13 does not interfere with the plurality of support walls 32 extending through substrate 26. In the following, substrate 26 and the components (such as conversion device 15) mounted on substrate 26 are also referred to as an "electric device" as a general term.

Metal substrate 25 is disposed on ring-shaped wall portion 31 and the plurality of support walls 32. Metal substrate 25 blocks the electromagnetic wave generated by power transmission coil 12. Metal substrate 25 intersects winding axis O1. The central part of metal substrate 25 protrudes toward the side opposite to the substrate 26 side. The central part of metal substrate 25 protrudes away from substrate 26. Metal substrate 25 is made of, for example, aluminum or aluminum alloy. Metal substrate 25 will be described in detail later.

The plurality of ferrite plates 24 are disposed on metal substrate 25, between power transmission coil 12 and metal substrate 25. The plurality of ferrite plates 24 are radially arranged to surround the protruding central part of metal substrate 25.

Bobbin 23 covers the plurality of ferrite plates 24 from the side opposite to the substrate 26 side with respect to metal substrate 25. Bobbin 23 has a coil groove 43 for power transmission coil 12 to be fitted therein. Bobbin 23 has principal surfaces opposite to each other. Coil groove 43 is disposed on one of the principal surfaces opposite to the other that faces the plurality of ferrite plates 24.

Bobbin 23 has a plurality of pins 16 at its outer peripheral edge. Pins 16 protrude toward principal surface 33 of base portion 30. Pins 16 are inserted in holes 39 in bosses 38, so that bobbin 23 is fixed to case body 21.

Power transmission coil 12 is fitted in coil groove 43. Power transmission coil 12 surrounds winding axis O1. In the example shown in FIG. 3, winding axis O1 extends in the up-down direction of the vehicle. Power transmission coil 12 is a spiral coil having an opening 49 at its central part.

Resin cover 22 is generally in the shape of a box with its one side in the up-down direction being open. Resin cover 22 has a plurality of protrusions 46 at its outer peripheral edge. Protrusions 46 have holes 47. Bolts 48 are inserted in holes 47 and tapped holes 28 in case body 21, so that resin cover 22 is fixed to case body 21.

The electric device contained in housing 20 may generate an electric-field noise. The electric-field noise is prevented from leaking out of housing 20.

Accordingly, as shown in FIG. 5, metal substrate 25 according to the present embodiment includes a partition wall 251 intersecting winding axis O1 (FIG. 3), and a peripheral wall 252 extending from partition wall 251 in the D direction. An end portion 252a of peripheral wall 252 is disposed in the D direction relative to an upper face 31a of ring-shaped wall portion 31. Further, end portion 252a is disposed in the U direction relative to a face 26a of substrate 26 facing in the D direction. That is, in the U-D direction, end portion 252a is located between upper face 31a of ring-shaped wall portion 31 and face 26a of substrate 26 facing in the D direction.

A part of a lateral face 252b of peripheral wall 252 is in contact with a lateral face 31b of ring-shaped wall portion 31. In the present embodiment, lateral face 252b on the side of end portion 252a is in contact with lateral face 31b of ring-shaped wall portion 31. At the part at which end portion 252a faces base portion 30, the direction from the inside to the outside of housing 20 (i.e., the R-L direction) is equivalent to an example of the "leak direction" according to the present disclosure.

With metal substrate 25 formed as described above, the electric device can be covered with case body 21 (base portion 30 and ring-shaped wall portion 31) and metal substrate 25. Thus, the electric-field noise generated from the electric device reflects within the region covered with metal substrate 25 and case body 21, without leaking from the region directly to the outside.

When the electric-field noise generated from the electric device is reflected by the conductive shield (e.g., case body 21), a reflection loss is produced and the electric-field noise is attenuated.

In the above-described region, the electric-field noise is attenuated by reflecting on case body 21 and metal substrate 25. This can reduce the leak of the electric-field noise generated from the electric device to the outside of housing 20.

As described above, metal substrate 25 of power-transmission-side coil unit 3 according to the present embodiment includes partition wall 251 and peripheral wall 252. End portion 252a of peripheral wall 252 is disposed in the D direction relative to upper face 31a of ring-shaped wall portion 31. A part of lateral face 252b of peripheral wall 252 is in contact with lateral face 31b of ring-shaped wall portion 31. With metal substrate 25 formed in such a manner, the electric device is covered with metal substrate 25 and case body 21. Thus, the electric-field noise generated from the electric device is reflected and attenuated by metal substrate 25 and case body 21 without leaking from the region covered with metal substrate 25 and case body 21 directly to the outside. This can reduce the leak of the electric-field noise generated from the electric device to the outside of housing 20.

The configuration of power-reception-side coil unit 4 is almost the same as that of power-transmission-side coil unit 3 inverted in the U-D direction. Therefore, the technical idea related to the above-described power-transmission-side coil unit 3 can be applied to power-reception-side coil unit 4, as a matter of course. Thus, power-reception-side coil unit 4 can also reduce the leak of the electric-field noise generated from the electric device to the outside of the housing.

Comparative Example

Figure 6:
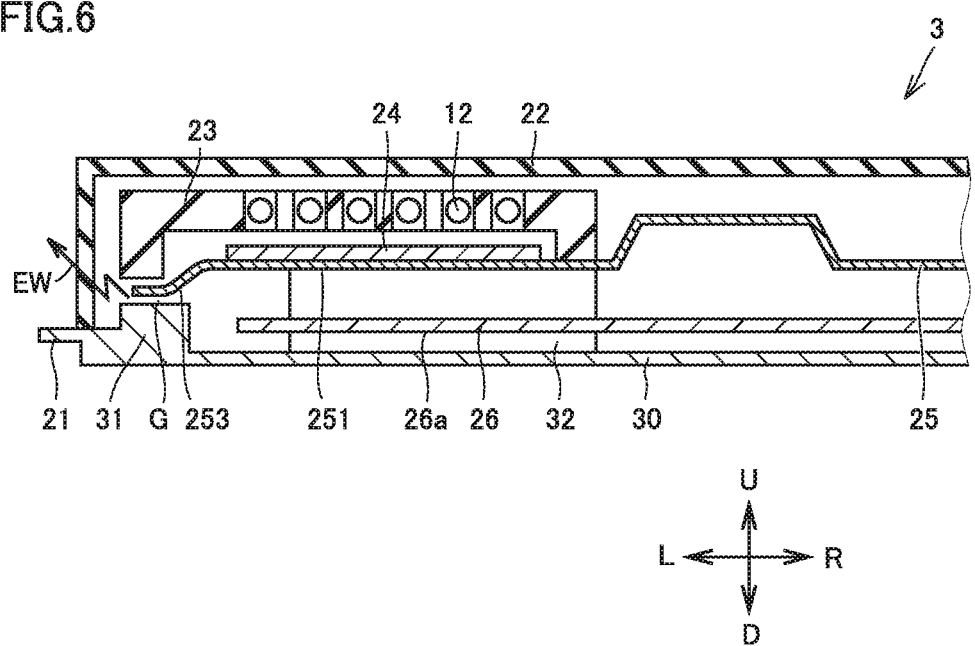
FIG. 6 is a diagram schematically showing the V-V cross section of a power-transmission-side coil unit according to a comparative example.

FIG. 6 is a diagram schematically showing the V-V cross section of a power-transmission-side coil unit according to a comparative example. With reference to FIG. 6, the configuration of metal substrate 25 and an electric-field noise generated from an electric device of a power-transmission-side coil unit according to the comparative example are described.

As shown in FIG. 6, metal substrate 25 of a power-transmission-side coil unit according to the comparative example has a peripheral wall 253 extending from partition wall 251 toward upper face 31a of ring-shaped wall portion 31. Peripheral wall 253 is fastened to ring-shaped wall portion 31 with, for example, a bolt and nut (not shown). In such a case, as shown in FIG. 6, there may be a gap G between peripheral wall 253 and upper face 31a of ring-shaped wall portion 31 which may cause a leak of an electric-field noise EW generated from the electric device. Such a gap 0 may form a path through which electric-field noise EW generated from the electric device leaks from the region covered with metal substrate 25 and case body 21 directly to the outside of the region. Accordingly, electric-field noise EW generated from the electric device may directly leak out of housing 20 without being reflected by metal substrate 25 and case body 21.

If the electric-field noise leaks out of housing 20 without being attenuated, it may affect other devices.

(Variation 1)

The embodiment has described an example in which, in the U-D direction, end portion 252a of peripheral wall 252 is located between upper face 31a of ring-shaped wall portion 31 and face 26a of substrate 26 facing in the D direction. However, the location of end portion 252a is not limited to this example. If a part of lateral face 252b of peripheral wall 252 is in contact with lateral face 31b of ring-shaped wall portion 31, end portion 252a may be located at any place in the D direction relative to upper face 31a of ring-shaped wall portion 31 in the U-D direction.

Figure 7:
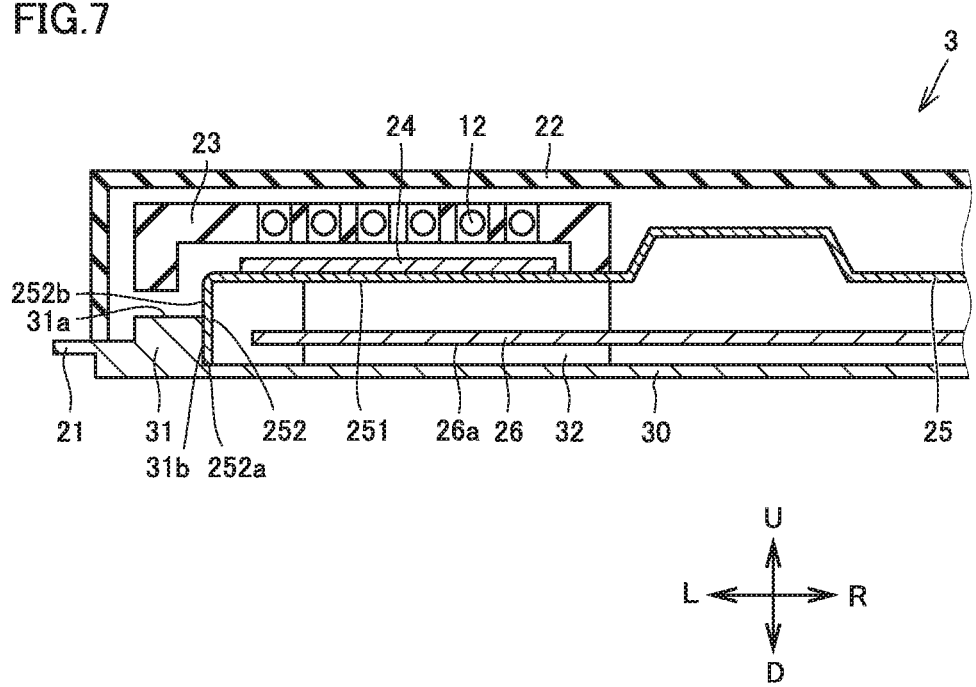
FIG. 7 is a diagram schematically showing the V-V cross section of a power-transmission-side coil unit according to variation 1.

FIG. 7 is a diagram schematically showing the V-V cross section of a power-transmission-side coil unit according to variation 1. Variation 1 describes an example in which a part of lateral face 252b of peripheral wall 252 is in contact with lateral face 31b of ring-shaped wall portion 31 and end portion 252a is in contact with base portion 30.

End portion 252a is in contact with base portion 30 so that the electric device is covered with metal substrate 25 and case body 21, thus more reliably preventing the electric-field noise generated from the electric device from leaking from the covered region to the outside. Accordingly, the electric-field noise generated from the electric device does not leak from the above-described region directly to the outside, and the reflected electric-field noise also does not easily leak to the outside of the above-described region. Thus, the electric-field noise is repeatedly reflected and attenuated by metal substrate 25 and case body 21. This can reduce the leak of the electric-field noise generated from the electric device to the outside of housing 20.

Further, since end portion 252a of peripheral wall 252 of metal substrate 25 is in contact with base portion 30, metal substrate 25 can be improved in rigidity against, for example, a force applied from resin cover 22 in the D direction.

(Variation 2)

Figure 8:
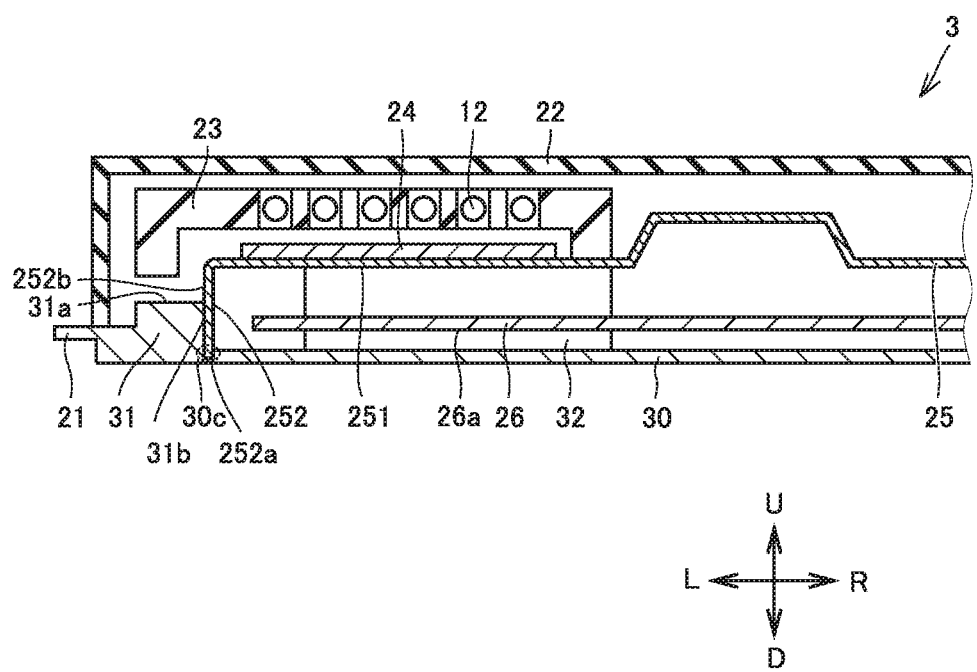
FIG. 8 is a diagram schematically showing the V-V cross section of a power-transmission-side coil unit according to variation 2.

FIG. 8 is a diagram schematically showing the V-V cross section of a power-transmission-side coil unit according to variation 2. Power-transmission-side coil unit 3 according to variation 2 has a recess 30c in base portion 30. In recess 30c, end portion 252a of peripheral wall 252 is inserted.

Thus, the electric device is covered with metal substrate 25 and case body 21, thus more reliably preventing the electric-field noise generated from the electric device from leaking from the covered region to the outside. Accordingly, the electric-field noise generated from the electric device does not leak from the above-described region directly to the outside, and the reflected electric-field noise also does not easily leak to the outside of the above-described region. Thus, the electric-field noise is repeatedly reflected and attenuated by metal substrate 25 and case body 21. This can reduce the leak of the electric-field noise generated from the electric device to the outside of housing 20.

As with variation 1, variation 2 can also improve metal substrate 25 in rigidity against a force applied from resin cover 22 in the D direction.

(Variation 3)

The embodiment has described an example in which a part of lateral face 252b of peripheral wall 252 is in contact with lateral face 31b of ring-shaped wall portion 31. However, a part of lateral face 252b of peripheral wall 252 being in contact with lateral face 31b of ring-shaped wall portion 31 is not an absolute limitation. If, in the U-D direction, end portion 252a of peripheral wall 252 is disposed in the D direction relative to face 26a of substrate 26 facing in the D direction, peripheral wall 252 may be located between ring-shaped wall portion 31 and the outer peripheral edge of substrate 26 in the R-L direction.

Figure 9:
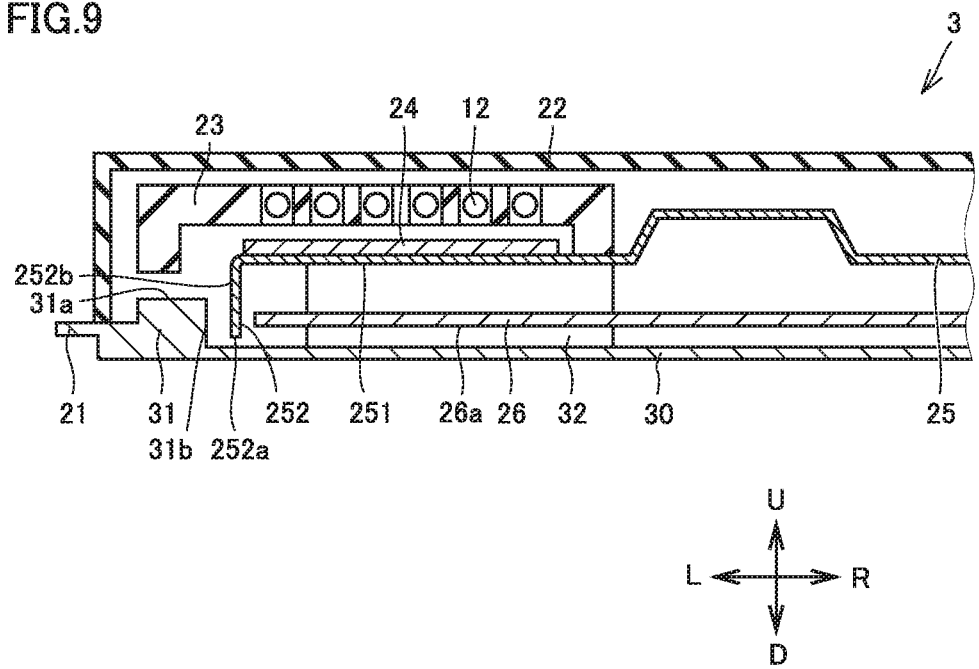
FIG. 9 is a diagram schematically showing the V-V cross section of a power-transmission-side coil unit according to variation 3.

FIG. 9 is a diagram schematically showing the V-V cross section of a power-transmission-side coil unit according to variation 3. In variation 3, in the U-D direction, end portion 252a of peripheral wall 252 is disposed in the D direction relative to face 26a of substrate 26 facing in the D direction. Peripheral wall 252 is located between ring-shaped wall portion 31 and the outer peripheral edge of substrate 26 in the R-L direction. Such a metal substrate 25 can also block the path through which the electric-field noise generated from the electric device directly leaks from the region covered with metal substrate 25 and case body 21. Accordingly, the electric-field noise generated from the electric device is reflected and attenuated by metal substrate 25 and case body 21. This can reduce the leak of the electric-field noise generated from the electric device to the outside of housing 20.

In variation 3, end portion 252a of peripheral wall 252 may be in contact with base portion 30 as described in variation 1. Also, base portion 30 may have recess 30c, with end portion 252a of peripheral wall 252 being inserted in recess 30c, as described in variation 2. By doing so, as with variation 1 and variation 2, the electric-field noise generated from the electric device does not leak directly to the outside from the region covered with metal substrate 25 and case body 21, and the reflected electric-field noise also does not easily leak to the outside of the above-described region. Accordingly, the electric-field noise is repeatedly reflected and attenuated by metal substrate 25 and case body 21, thus reducing the leak of the electric-field noise out of housing 20.

(Variation 4)

Figure 10:
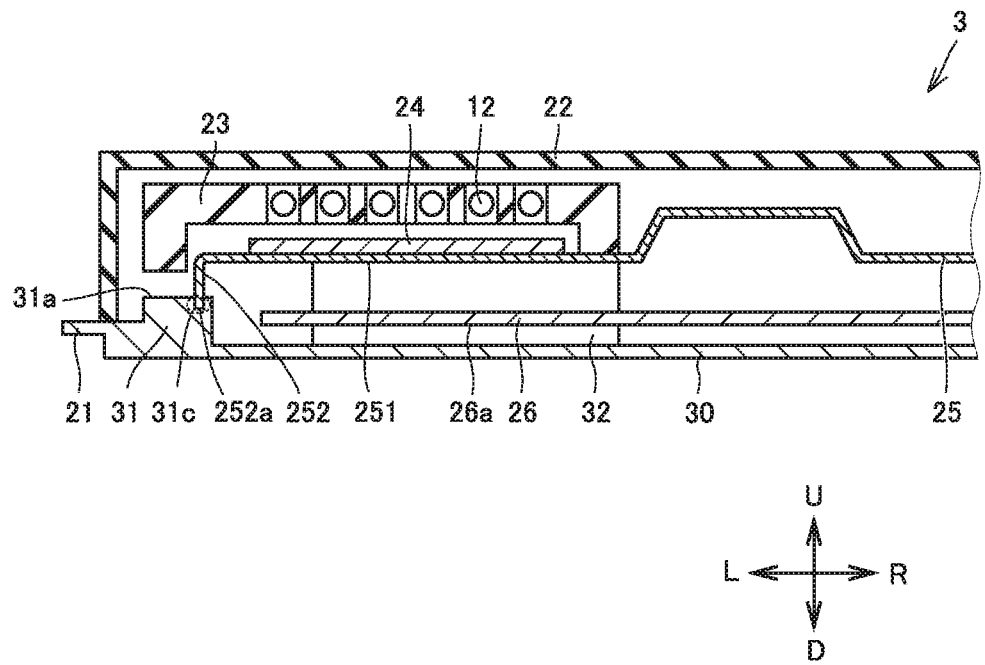
FIG. 10 is a diagram schematically showing the V-V cross section of a power-transmission-side coil unit according to variation 4.

FIG. 10 is a diagram schematically showing the V-V cross section of a power-transmission-side coil unit according to variation 4. Power-transmission-side coil unit 3 according to variation 4 has recess 31c in ring-shaped wall portion 31. End portion 252a of peripheral wall 252 is inserted in recess 31c. Thus, the electric device is covered with metal substrate 25 and case body 21, thus more reliably preventing the electric-field noise generated from the electric device from leaking from the covered region to the outside. Accordingly, the electric-field noise generated from the electric device does not leak from the above-described region directly to the outside, and the reflected electric-field noise also does not easily leak to the outside of the above-described region. Thus, the electric-field noise is repeatedly reflected and attenuated by metal substrate 25 and case body 21. This can reduce the leak of the electric-field noise generated from the electric device to the outside of housing 20.

As with variation 1 and variation 2, variation 4 can also improve metal substrate 25 in rigidity against a force applied from resin cover 22 in the D direction.

(Variation 5)

Figure 11:
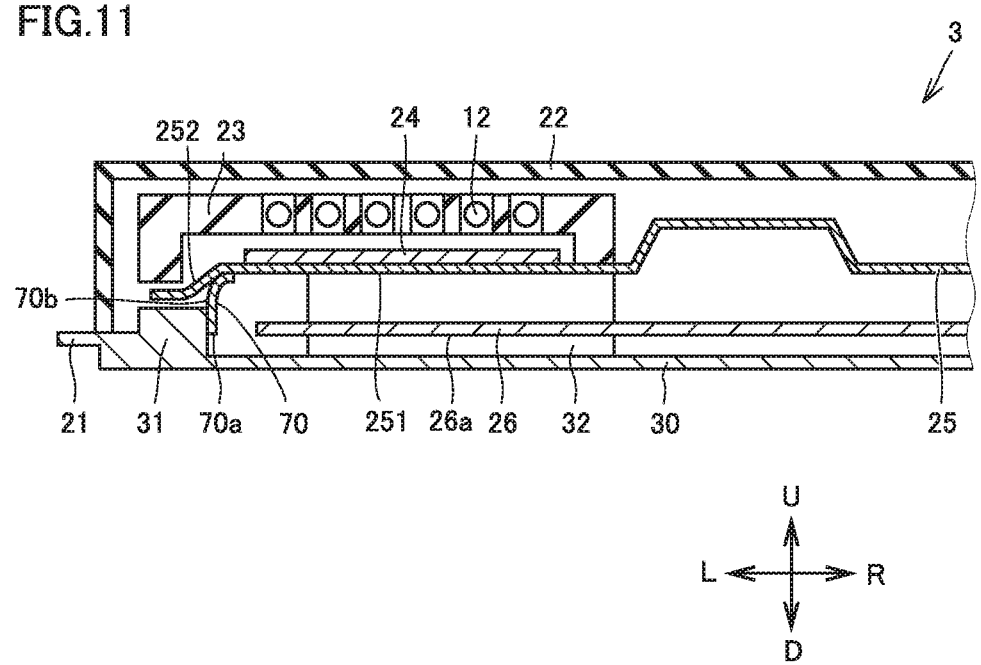
FIG. 11 is a diagram schematically showing the V-V cross section of a power-transmission-side coil unit according to variation 5.

FIG. 11 is a diagram schematically showing the V-V cross section of a power-transmission-side coil unit according to variation 5. In order to reduce the direct leak of the electric-field noise generated from the electric device out of the region covered with metal substrate 25 and case body 21, a separate shield member 70 may be provided on metal substrate 25.

Metal substrate 25 of power-transmission-side coil unit 3 according to variation 5 has the same configuration as that of the comparative example. Shield member 70 is made of, for example, aluminum or aluminum alloy. Shield member 70 is located between ring-shaped wall portion 31 and the outer peripheral edge of substrate 26 in the R-L direction.

One end of shield member 70 is fastened to partition wall 251 and/or peripheral wall 252 of metal substrate 25 with, for example, a bolt and nut. The other end of shield member 70 extends from the one end in the D direction. An end portion 70a at the other end of shield member 70 is disposed in the D direction relative to upper face 31a of ring-shaped wall portion 31. A part of a lateral face 70b of shield member 70 is in contact with lateral face 31b of ring-shaped wall portion 31. Shield member 70 extends in the front-back direction (F-B direction) in the figure.

By fastening shield member 70 to metal substrate 25 as described above, the electric device can be covered with metal substrate 25, shield member 70, and case body 21. This can block the path through which the electric-field noise generated from the electric device directly leaks from the region covered with metal substrate 25, shield member 70, and case body 21. Accordingly, the electric-field noise generated from the electric device is reflected and attenuated by metal substrate 25, shield member 70, and case body 21. This can reduce the leak of the electric-field noise generated from the electric device to the outside of housing 20.

Variation 5 can be combined with any of variations 1 to 4. Any of such combinations can also bring about the same advantageous effects as those of variations 1 to 4.

Although variation 5 has described an example in which shield member 70 is provided as a separate member, shield member 70 may be integrated with metal substrate 25.

(Variation 6)

The embodiment has described an example in which case body 21 includes base portion 30 and ring-shaped wall portion 31, with ring-shaped wall portion 31 being equivalent to an example of the "shield" according to the present disclosure. However, another member may be provided as the shield. The member may be made of, for example, aluminum or aluminum alloy.

Although embodiments of the present disclosure have been described, it should be understood that the embodiments disclosed herein are by way of example in every respect, not by way of limitation. The scope of the present disclosure is defined by the terms of the claims and is intended to include any modification within the meaning and scope equivalent to the terms of the claims.

What is claimed is:

1. A coil unit comprising:
    a housing including a metal body, and a resin cover covering the metal body;
    an electric device provided in the housing;
    a metal substrate disposed between the cover and the electric device and covering the electric device;
    a coil provided in the housing; and
    a shield provided in the housing,
    the metal substrate including
        a partition wall disposed between the cover and the electric device, and
        a peripheral wall extending from the partition wall toward the metal body,
    the coil being disposed between the partition wall and the cover,
    the shield being disposed ahead of a part in a leak direction, the part being a part at which the metal body faces an end portion of the peripheral wall, the leak direction being a direction from inside to outside of the housing at the part,
    the end portion being disposed in a direction of the metal body relative to a surface of the shield that faces the cover,
    at least a part of a surface of the peripheral wall that faces the shield being in contact with the shield.

2. The coil unit according to claim 1, wherein the end portion is disposed in the direction of the metal body relative to a surface of the electric device that faces the metal body.

3. The coil unit according to claim 1, wherein the end portion is in contact with the metal body.

4. The coil unit according to claim 1, wherein the metal body has a recess, and
    the end portion is inserted in the recess.

* * * * *